(12) United States Patent
Chua (10) Patent No.: US 11,763,660 B2
(45) Date of Patent: Sep. 19, 2023

(54) MONITORING AN ENVIRONMENT FOR OBJECTS LEFT BY INDIVIDUALS (71) Applicant: Aurora Flight Sciences Corporation, a subsidiary of The Boeing Company, Manassas, VA (US)

(72) Inventor: Zarrin Chua, Boston, MA (US)

(73) Assignee: AURORA FLIGHT SCIENCES CORPORATION, Manassas, VA (US)

( * ) Notice: Subject to any disclaimer, the term of this patent is extended or adjusted under 35 U.S.C. 154(b) by 0 days.

(21) Appl. No.: 17/546,280

(22) Filed: Dec. 9, 2021

(65) Prior Publication Data

US 2022/0246020 A1 Aug. 4, 2022

Related U.S. Application Data (60) Provisional application No. 63/145,712, filed on Feb. 4, 2021.

(51) Int. Cl.
*G08B 21/24* (2006.01)
*G08B 7/06* (2006.01)
*G06V 20/59* (2022.01)
*G06V 40/10* (2022.01)
*G06V 40/20* (2022.01)
*G06T 7/70* (2017.01)
*G06T 7/20* (2017.01)
*G06N 20/00* (2019.01)
*G06V 10/74* (2022.01)

(52) U.S. Cl.
CPC ............ *G08B 21/24* (2013.01); *G06N 20/00* (2019.01); *G06T 7/20* (2013.01); *G06T 7/70* (2017.01); *G06V 10/761* (2022.01); *G06V 20/593* (2022.01); *G06V 40/103* (2022.01); *G06V 40/20* (2022.01); *G08B 7/06* (2013.01); *G06T 2207/20081* (2013.01); *G06T 2207/30268* (2013.01)

(58) Field of Classification Search
CPC combination set(s) only.
See application file for complete search history.

(56) References Cited

U.S. PATENT DOCUMENTS 10,311,704 B1 * 6/2019 Xu ................... G06F 18/24143
2022/0207313 A1 * 6/2022 Huijsing .............. B64D 11/003

* cited by examiner

*Primary Examiner* — Thomas S McCormack
(74) *Attorney, Agent, or Firm* — Sage Patent Group (57) ABSTRACT A method of operating a cabin monitoring system. The cabin monitoring system can determine that an object is associated with an individual. The cabin monitoring system can further determine that the individual is exiting an area that includes the object. The cabin monitoring system can further include transmitting an alert to an output device based on determining that the individual is exiting the area that includes the object. The alert can indicate that the object has been left in the area.

20 Claims, 5 Drawing Sheets

MONITORING AN ENVIRONMENT FOR OBJECTS LEFT BY INDIVIDUALS

CROSS REFERENCE TO RELATED APPLICATIONS

The present application claims benefit of priority to U.S. Provisional Patent Application No. 63/145,712 filed Feb. 4, 2021.

FIELD

The subject disclosure is related to monitoring an environment for objects left by individuals. In particular, the subject disclosure relates to an aircraft cabin object monitoring system.

BACKGROUND

After even a short time in an environment (e.g., a vehicle cabin or a theatre), individuals may mistakenly leave an object (e.g., a wallet or a cell phone) behind. Further, some individuals may choose to leave objects (e.g., trash) behind. Identifying, removing, and sorting these objects can require time and effort from operators of the environment, which can lead to a loss in revenue and a reduction in customer satisfaction. For example, the turnaround time between flights of an aircraft can be affected by the volume of object left on the aircraft by passengers of the previous flight.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

In some embodiments, a method of operating a cabin monitoring system is provided. The method includes determining, by processing circuitry of the cabin monitoring system, that an object located within an area is associated with an individual. The method further includes determining, by the processing circuitry, that the individual is exiting an area. The method further includes transmitting, by the processing circuitry via a transceiver of the cabin monitoring system, an alert to an output device based on determining that the individual is exiting the area. The alert can indicate that the object has been left in the area.

In other embodiments, a cabin monitoring system of a vehicle is provided. The cabin monitoring system can include processing circuitry and memory coupled to the processing circuitry. The memory having instructions stored therein that are executable by the processing circuitry for causing the cabin monitoring system to perform operations. The operations can include determining that an object in the vehicle is associated with an individual in the vehicle. The operations can further include determining that the individual is exiting the vehicle while the object remains in the vehicle. The operations can further include transmitting, via a transceiver, an alert to an output device based on determining that the individual is exiting the vehicle while the object remains in the vehicle. The alert can indicate that the object has been left in the vehicle.

In other embodiments, a non-transitory computer readable medium is provided. The non-transitory readable medium has instructions stored therein that, when executed by processing circuitry, cause the processing circuitry to perform operations. The operations can include determining that an object located within an area of an aircraft is associated with an individual located in the area. The operations can further include determining that the individual is exiting the area and is not likely to return to the area while the object remains in the area. The operations can further include, responsive to determining that the individual is exiting the area and is not likely to return to the area while the object remains in the area, facilitating transmission of notification data to an output device. The notification data can indicate that the object has been left in the area. based on determining that the individual is exiting the aircraft while the object remains in the aircraft.

The features and functions can be achieved independently in various embodiments of the subject disclosure or may be combined in yet other embodiments in which further details can be seen with reference to the following description and drawings.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Embodiments of the inventive concepts now will be described more fully hereinafter with reference to the accompanying drawings, in which embodiments of the inventive concepts are shown. The inventive concepts can, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

Various embodiments herein describe a monitoring system for an area (e.g., a vehicle cabin, a boarding area, a baggage claim, a theatre, or a portion thereof) to identify objects that are left in the area after individuals (e.g., vehicle passengers or theatre patrons) have left or are leaving the area. In some embodiments, the monitoring system associates an object with a specific individual and determines whether the object was mistakenly left or is no longer desired by the individual. In additional or alternative embodiments, the monitoring system can transmit an alert to either notify the individual associated with the object or an operator of the area of the object being left in the area.

In some embodiments, the monitoring system can improve customer experience by reducing the likelihood of the items being left behind and reduce the turnaround time by minimizing the amount of trash or lost objects that are to be removed and sorted before the area can be returned to service. In some examples, the monitoring system can be implemented in an aircraft cabin and reduce the turnaround time between flights. In additional or alternative examples, the monitoring system can be implemented in a movie theatre and reduce the turnaround time between movies.

Figure 1:
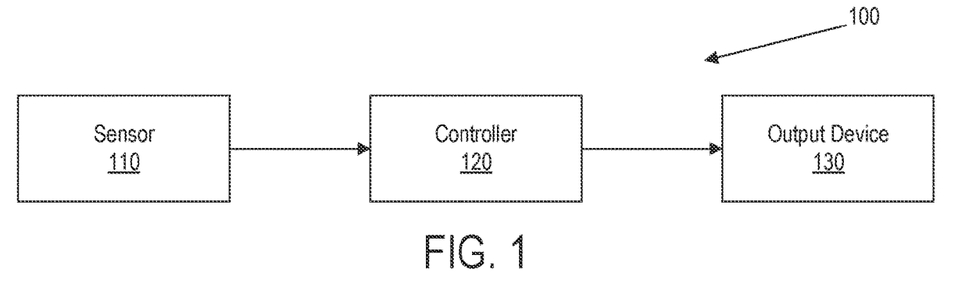
FIG. 1 is a block diagram illustrating an example of a system for monitoring object left by individuals according to some embodiments.

FIG. 1 is a block diagram illustrating an example of a monitoring system 100 for monitoring an environment for one or more objects left behind by an individual. The system includes a sensor 110, a controller 120, and an output device 130.

In some embodiments, the monitoring system 100 includes a combination of sensors 110 to monitor the state of the area and various objects (e.g., luggage, wallets, cell phones, tablet devices, headphones, and paper) and individuals (e.g., passengers, pilots/crew, customers, and employees). In some examples, the sensors 110 can include electro-optical/infra-red ("EO/IR") cameras that continuously monitor the state of the area and provide a video signal to the controller 120. In additional or alternative examples, the sensors 110 include a wireless communication antenna for detecting wireless communication devices and/or performing WiFi doppler imaging; load cells and/or pressure sensors in seats, baggage compartments, or in the floor; or IR emitters that feed data to the controller. The sensors 110 can identify objects and individuals in the area and provide information to the controller 120 for tracking the objects and individuals. In some examples, tracking of individuals occurs after receiving their permission and use of the tracking data would be in compliance with data privacy laws that ensure end-user privacy protection. In additional or alternative examples, the controller 120 can use the data from the sensors 110 to identify and label/classify the objects detected within the area.

In additional or alternative embodiments, the controller 120 can associate an object in the area with an individual. The controller 120 can associate the object with the individual based on detecting an interaction between the object and the individual. The controller 120 can associate the object with the individual based on a position and/or characteristic of the object relative to a position and/or characteristic of the individual. For example, the controller 120 can associate a tie on a seat beside a seat used by a man in a business suit without a tie as belonging to the man.

In additional or alternative embodiments, the controller 120 determines that the individual is exiting the area and leaving the object and assesses the intent of the individual to determine when, how, and who to alert regarding the object. In some examples, the controller 120 uses sensor data indicating a direction of movement of an individual (e.g., towards an exit) and sensor data indicate a state of the area (e.g., exit doors are open) to determine that the individual is exiting the area and is not likely to return to the area (e.g., the individual is not simply stretching their legs or using a restroom). In additional or alternative examples, the controller 120 predicts the intent of the individual in regards to an object. For example, if an aircraft passenger leaves an empty (no thermal signature detected by an IR sensor) white cup in a cupholder and walks towards an exit of the aircraft, the controller 120 can classify the white cup as trash intentionally left by the passenger. By contrast, if the passenger enters the aircraft, places the white cup in the cupholder, and sits down, the controller 120 can classify the white cup as a place object that is in use.

In some examples, the controller 120 determines that the passenger mistakenly left the object, and the controller 120 transmits alerts to the output device 130 (e.g., a visual display, speaker, or user device associated with or within range of the individual, or associated with an operator) to notify the individual or the operator that the object has been left. The controller 120 can transmit multiple alerts that grow in intensity depending on the movement of the individual (e.g., an audio alert that is louder and more persistent the more rapidly an individual is exiting). In additional or alternative examples, the controller 120 determines that the passenger intended to leave the object, and the output device 130 notifies an operator (e.g., cabin crew, maintenance personnel, cleaning crew, ground staff, driver, or other vehicle operator) of the area. The monitoring system 100 can provide details regarding the type and/or location of the object to allow the operator to more efficiently handle the object. The monitoring system 100 can also provide details regarding the individual so that the operator can hold the individual accountable (e.g., a reduced rating for ride-share passengers that leave trash). In additional or alternative examples, the monitoring system 100 can determine that the individual intended to leave the object and transmit a different alert to the individual based on the intent to leave the object compared to if the monitoring system 100 determined that the individual intended to exit the area with the object (e.g., take the object). For example, the controller 120 can transmit an alert that causes the output device 130 to output "Please collect your trash in the cupholder on the left side of the vehicle as to keep this vehicle clean. A trash can is immediately outside the vehicle exit." on a video display screen or as audio via speaker. In additional or alternative examples, a reminder is provided via an in-seat display for seats where trash has been detected. For example, during taxing or once an aircraft has reached a gate, but prior to a passenger exiting the aircraft, the monitoring system 100 can detect that a passenger is standing up (e.g., to remove baggage from an overhead bin), but has not gathered all of their trash. The controller 120 can transmit a reminder to the in-seat display associated with the passenger. In additional or alternative embodiments, the monitoring system 100 can detect that an individual has broken or damaged a portion of the area and alert the operator.

Figure 2:
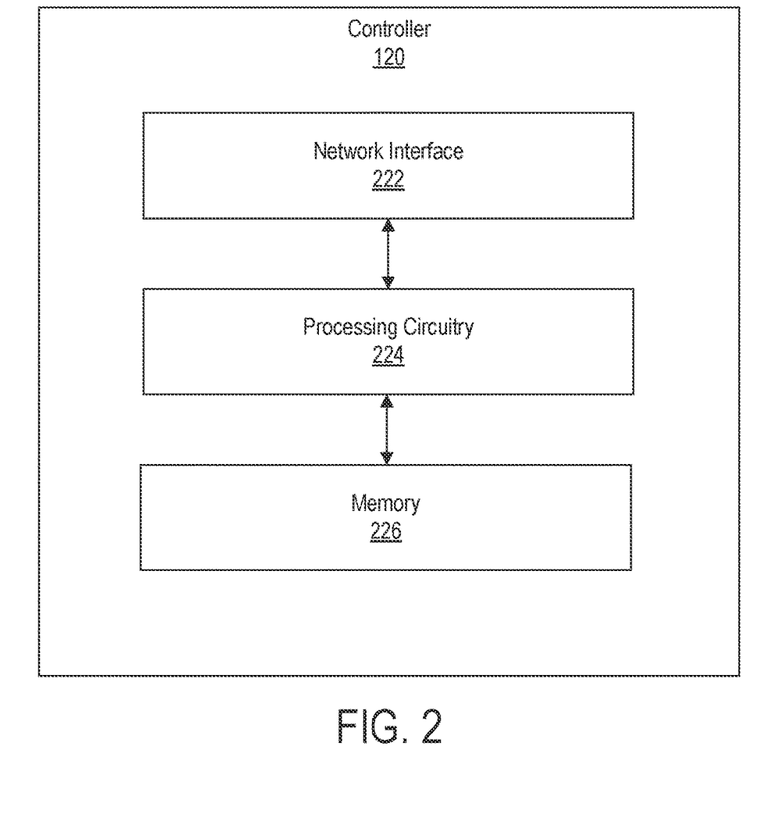
FIG. 2 is a block diagram illustrating an example of a controller for monitoring objects left by individuals according to some embodiments.

FIG. 2 is a block diagram illustrating an example of the controller 120. As illustrated, the controller 120 includes a network interface 222, processing circuitry 224, and memory 226. The network interface 222 can include a transceiver and be configured to communicate with one or more sensors, output devices, and remote servers. The memory 226 can include computer-readable program code that, when executed by the processing circuitry 224, causes the processing circuitry 224 to perform operations according to embodiments disclosed herein. According to other embodiments, processing circuitry 224 can be defined to include memory, so that separate memory is not required.

As discussed herein, operations of the controller 120 can be performed by processing circuitry 224. In some embodiments, processing circuitry 224 can determine an association between an object and an individual based on sensor data. For example, processing circuitry 224 can determine an object belongs to an individual based on receiving sensor data indicating the object is being held by the individual. In additional or alternative embodiments, processing circuitry 224 can determine that the individual is exiting an area and leaving the object based on sensor data. For example, processing circuitry 224 can receive position and/or movement information of the individual from the sensor indicating that the individual is heading towards the exit. In additional or alternative embodiments, processing circuitry 224 can determine an intent of the individual in regards to the object based on the sensor data. For example, the processing circuitry 224 can determine that the individual mistakenly left the object or that the individually knowingly/intentionally left the object.

In some embodiments, processing circuitry 224 can manage a machine learning model (e.g., a neural network) that predicts an association between an individual and an object, predicts a behavior of the individual, and/or predicts an intent of the individual based at least on sensor data. The processing circuitry 224 can update the machine learning model based on the results of notifying the individual and/or operator. For example, processing circuitry 224 can update the machine learning model based on an individual's and/or operator's action (or lack of action) regarding an object that the individual was notified as having left behind. This information can be used to improve the machine learning model. In additional or alternative embodiments, the monitoring system can request user feedback regarding intent as well as object association and use the feedback to improve the machine learning model. For example, the processing circuitry 224 can cause a message to be sent to a passenger that states "object X was left behind near your seat. Was this object yours?" and use the response to update the object association portion of the machine learning model.

Moreover, modules can be stored in memory 226, and these modules can provide instructions, so that when instructions of a module are executed by processing circuitry 224, processing circuitry 224 performs respective operations (e.g., operations discussed below with respect to FIGS. 5-8).

Figure 3:
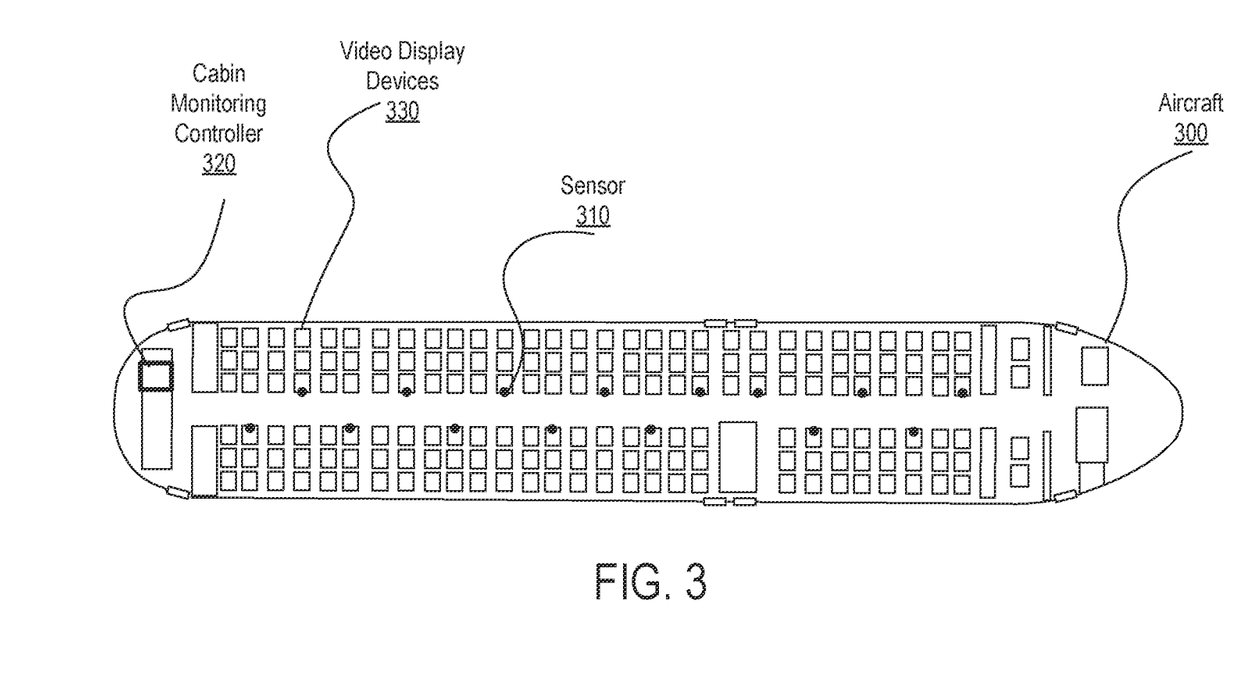
FIG. 3 is a schematic diagram illustrating an example of a system for monitoring an aircraft for an object left by an individual according to some embodiments.

FIG. 3 is a schematic diagram illustrating an example of a system for monitoring an aircraft 300 for objects left by individuals (e.g., passengers or flight crew). The system can include sensors 310, a cabin monitoring controller 320, and video display devices 330. Although sensors 310, cabin monitoring controller 320, and video display devices 330 are displayed as onboard the aircraft 300, in other examples some of these objects may be partiality or fully remote from the aircraft 300. In some examples, video display devices may be located in waiting areas or elsewhere in a terminal. In additional or alternative examples, the cabin monitoring controller may be cloud based with only a connection to onboard devices.

In this example, the sensors 310 are dispersed along the aisle of the aircraft 300 and can include WiFi antennas for detecting wireless communication devices and/or doppler imaging of the cabin. In additional or alternative examples, the sensors 310 can include cameras and pressure sensors. The sensors can detect objects and individuals in the cabin and provide information associated with the objects and individuals to the cabin monitoring controller 320. In some examples, the cabin monitoring controller 320 can track the objects and individuals and determine an association between an object and an individual based on the information from the sensors. In additional or alternative examples, the cabin monitoring controller 320 uses data from others sources including, but not limited to, seat assignment information or other flight-related data. In response to receiving information from the sensors 310 indicating that the individual is exiting the aircraft 300 and leaving the object, the cabin monitoring controller 320 can predict an intent of the individual with regards to the object (e.g., whether the individual forgot the object or intentionally left the object). Based on the predicted intent, the cabin monitoring controller 320 can transmit an alert to notify the individual and/or an operator of the aircraft 300 (e.g., a flight attendant) that the object has been left by the individual. In this example, the cabin monitoring controller 320 can transmit an alert to one of the video display devices 330 (or other output devices in an environment near the aircraft/vehicle/area such as at a gate or a baggage claim as well as other output devices associated with the user such as a mobile phone) to cause the video display device 330 to display a message indicating that the individual left the object.

Figure 4:
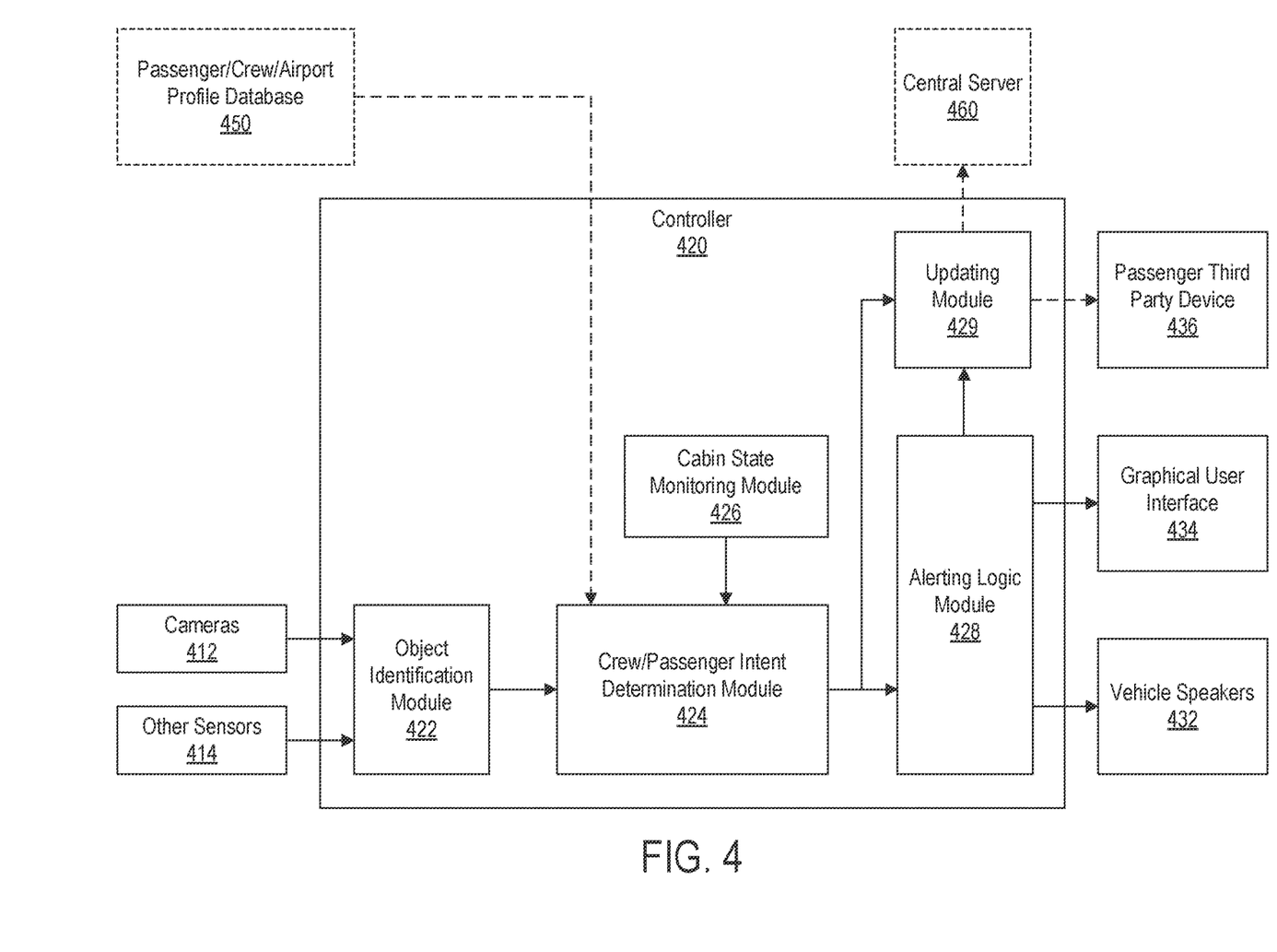
FIG. 4 is a block diagram illustrating an example of a cabin monitoring system according to some embodiments.

FIG. 4 is a block diagram illustrating an example of a controller 420 for monitoring an aircraft for an objects left by individuals. As illustrated, the controller 420 can include an object identification module 422, a crew/passenger intent determination module 424, a cabin state monitoring module 426, an alerting logic module 428, and an updating module 429.

The object identification module 422 can be communicatively coupled to cameras 412 and other sensors 414. The cameras 412 can include EO/IR cameras that capture video or images of the cabin of the aircraft and transmit sensor data (including the video or images) to the object identification module 422. The other sensors 414 can include any suitable sensor including, but not limited to, pressure sensors and wireless communication antennas that transmit sensor data to the object identification module 422. The object identification module 422 can receive sensor data from the cameras 412 and the other sensors 414. The object identification module 422 can identify objects (including individuals) based on the sensor data. In some examples, the object identification module 422 can classify the objects and associate specific objects with specific individuals. For example, an object located on, below, and/or near a seat, seat pocket, or tray table can be associated with a passenger assigned to or seated on or closest to that seat. In additional or alternative examples, the object identification module 422 distinguishes between personal objects (associated with an individual) and objects that are intended to be left (e.g., objects provided by an airline to be left in the aircraft such as an in-flight entertainment magazine or aircraft safety booklet). In additional or alternative examples, the object identification module 422 can determine that an individual is exiting the aircraft and leaving behind an associated object. In response to determining that the individual is exiting the aircraft and leaving behind the associated object, the object identification module 422 can notify the crew/passenger intent determination module 424.

The crew/passenger intent determination module 424 can receive information associated with the objects and individuals in the cabin from the object identification module 422. The crew/passenger intent determination module 424 can also receive information from the cabin state monitoring module 426, which can capture and track changes in the cabin state (e.g., boarding, prepared for takeoff, and landed, deboarding). The crew/passenger intent determination module 424 can also receive information associated with specific individuals from a passenger/crew profile database 450. In some examples, the crew/passenger intent determination module 424 can determine an intent of the individual leaving the aircraft in regards to the object being left behind based on the information from the object identification module 422, cabin state monitoring module 426, and the passenger/crew/airport profile database 450. The intent may be to leave the object or the intent may be that the object was mistakenly left behind. The determined (or predicted intent) can be transmitted to the alerting logic module 428 and an updating module 429.

The alerting logic module 428 is communicatively coupled to vehicle speaker 432, a graphical user interface 434, the updating module 429, and the passenger third party device 436 (here illustrated as via the updating module 429). The alerting logic module 428 can generate an alert based on the determined intent and transmit the alert to an output device (e.g., the vehicle speakers 432, graphical user interface 434, or passenger third party device 436) based on the determined intent. Furthermore, use of the airport (or heliport, vertiport) database can provide additional information regarding where trash can be disposed of or where lost-and-found desks are located.

The updating module 429 can include a transceiver for communicatively coupling with the passenger third party device 436 and central server 460. In some examples, the updating module 429 can transmit the alerts to the passenger third party device 436 or to the central server 460, which can attempt to contact the individual in other ways. For example, the updating module 429 can determine a phone number associated with the third party device 436 based on passenger seat assignment information. In additional or alternative examples, the updating module 429 can receive the predicted intent, transmitted alert, and the reaction of the user to the alert (not illustrated in FIG. 4) and transmit an update to the central server 460 for updating an individual's profile in the passenger/crew profile database 450. The reaction of the user is mainly to determine the effectiveness of the alerting modality, so as to better customize the alerts in the future.

The controller 420 can be an example of the controller 120 in FIGS. 1-2. The processing circuitry 224 of FIG. 2 can include the object identification module 422, the crew/passenger intent determination module 424, the cabin state monitoring module 426, the alerting logic module 428, and the updating module 429.

In additional or alternative embodiments, the monitoring system includes a machine learning model for associating objects with individuals and/or determining an intent of an individual regarding an object. In some examples, the machine learning model can be trained based on previous flights with a specific destination or departure location and learn to better predict a passenger's intent associated with objects left behind on flights associated with the location. For example, passengers departing Las Vegas can be more likely to leave objects they consider trash than passengers arriving in Las Vegas. Accordingly, the machine learning model can use past observations of flights to and from Las Vegas to more accurately determine a passenger's intent regarding an object on a flight to or from Las Vegas. In additional or alternative examples, the machine learning model can receive, with an individual's authorization, the individual's personal history and tendencies (e.g., frequency of forgetting something underneath a seat or possession of a cell phone that is often left on a particular color seat) and use the individual's personal history to more accurately determine the individual's intent with regards to a object left in an area. In additional or alternative examples, the machine learning model can be trained based on reservation data/passenger information. For example, passengers traveling with infants/kids may be more likely to forget items than solo travelers.

In some embodiments, the results of an intent determination and results of an alert transmission can be used to update the machine learning model and/or an individual's personal profile. For example, the monitoring system can note an individual's action regarding an object that the individual was notified as having left behind (e.g., returning to collect the object, returning to trash the object, or not returning for the object). This information can be used to improve the machine learning model and/or affect the individual's rating for use by the operator.

FIGS. 5-8 are flow charts illustrating examples of processes for monitoring an environment for objects left by individuals. The processes can be performed by one or more processors in a monitoring system (e.g., monitoring system 100 of FIG. 1). FIGS. 5-8 are described below as performed by processing circuitry 224 of controller 120, however, other implementations are possible.

Figure 5:
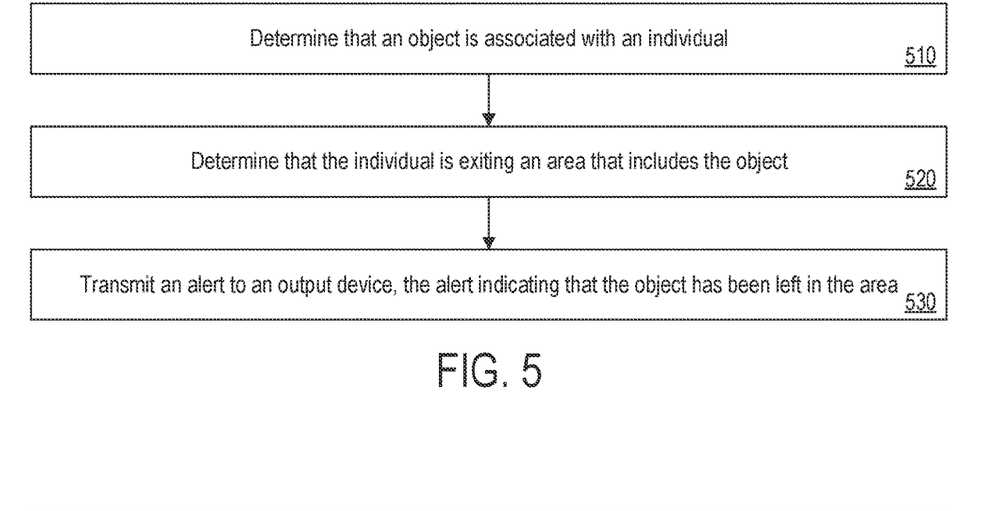
FIGS. 5-8 are flow charts illustrating examples of operations performed by a controller for monitoring objects left by individuals according to some embodiments.
Figure 6:
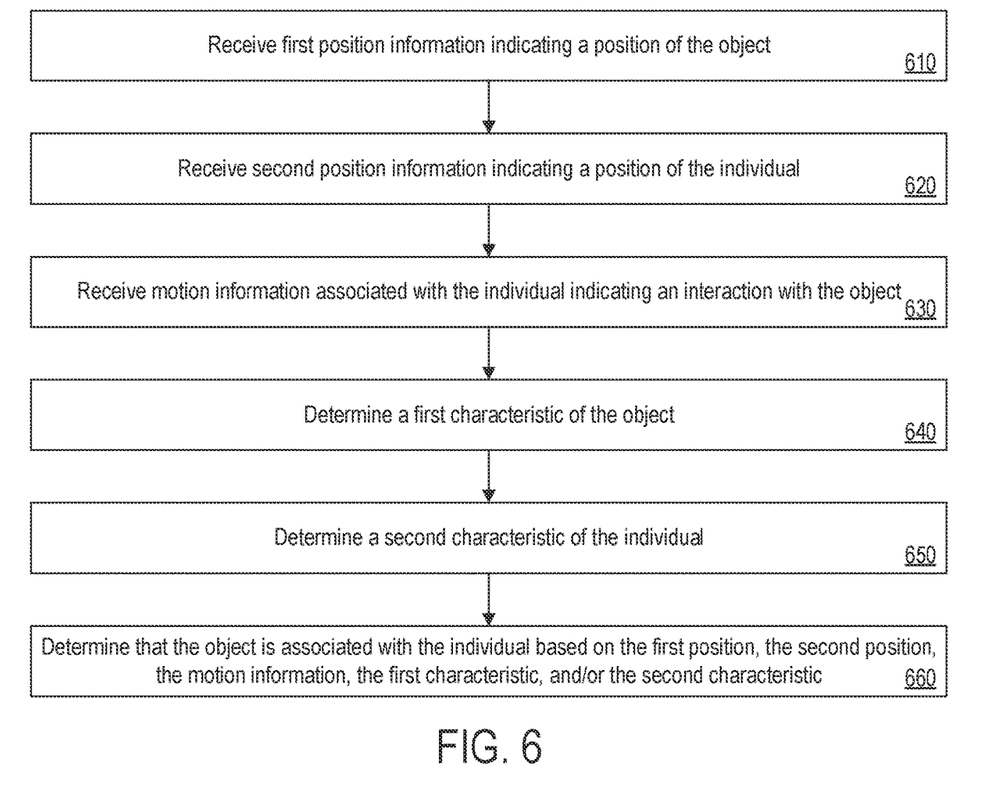

FIG. 5 illustrates a process for monitoring an environment for object left by an individual. At block 510, processing circuitry 224 determines that an object is associated with an individual. In some embodiments, a machine learning model can be used to determine that the object is associated with the individual. FIG. 6 illustrates an example of an additional process for determining that the object is associated with the individual.

At block 610, processing circuitry 224 receives, via network interface 222, first position information indicating a position of the object. At block 620, processing circuitry 224 receives, via network interface 222, second position information indicating a position of the individual. At block 630, processing circuitry 224 receive, via network interface 222, motion information associated with the individual indicating an interaction with the object. In some examples, the first position information, second position information, and motion information can include a video signal from a camera, an indicator from a pressure sensor, or an indicator from a wireless communication antenna.

At block 640, processing circuitry 224 determines a first characteristic of the object. At block 650, processing circuitry 224 determines a second characteristic of the object. In some embodiment, processing circuitry 224 receives the first characteristic or the second characteristic directly from a sensor. In additional or alternative embodiments, processing circuitry 224 determines the first characteristic or the second characteristic by processing sensor data from the sensors.

At block 660, processing circuitry 224 determines that the object is associated with the individual based on the first position, the second position, the motion information, the first characteristic, and/or the second characteristic. In some embodiments, determining that the object is associated with the individual based on the first position information and the second position information includes determining that the object is in contact with the individual for a period of time greater than a predetermined threshold. In additional or alternative embodiments, determining that the object is associated with the individual further includes determining that the object is associated with the individual based on a type of the interaction (e.g., eating/drinking a portion of the object, watching/looking at the object, or manipulating the object). In additional or alternative embodiments, determining that the object is associated with the individual further includes determining that the object is associated with the individual based on a predetermined association of objects having the first characteristic and individuals having the second characteristic (e.g., a toy can be associated with a child, a walking cane can be associated with a senior, or a piece of a military uniform can be associated with an individual serving in the military.

Returning to FIG. 5, at block 520, processing circuitry 224 determines that the individual is exiting an area that includes the object. In some embodiments, the area is a cabin of an aircraft and determining that the individual is exiting the area includes determining that the individual is deboarding the aircraft. In some examples, determining that the individual is deboarding the aircraft includes receiving sensor data from the sensors indicating a position and/or movement of the individual as well as state information of the aircraft (e.g., whether the aircraft has landed and whether the door is open).

At block 530, processing circuitry 224 transmits, via network interface 222, an alert to an output device (e.g., output device 130 of FIG. 1), the alert indicating that the object has been left in the area. In some embodiments, processing circuitry 224 transmits the alert in response to determining that the individual is exiting the area that includes the object.

Figure 7:
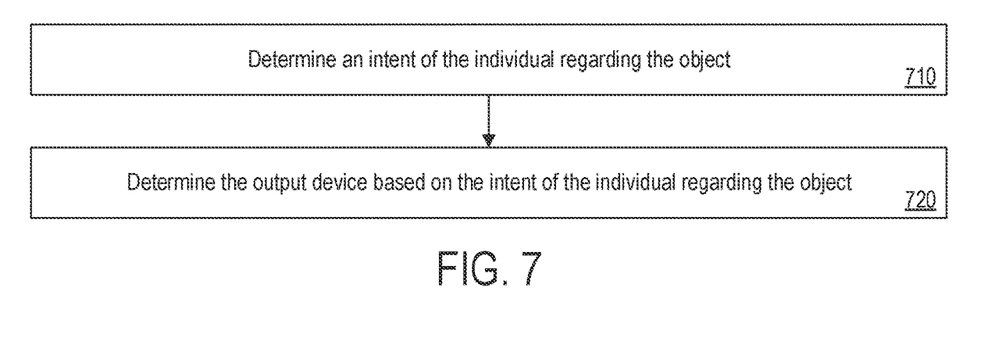

FIG. 7 illustrates an example of a process for determining the output device to which to transmit the alert. At block 710, processing circuitry 224 determines an intent of the individual regarding the object. In some embodiments, determining the intent of the individual regarding the object includes determining that the individual intended to exit the area with the object (e.g., take the object). In alternative embodiments, determining the intent of the individual regarding the object includes determining that the individual intended to leave the object.

At block 720, processing circuitry 224 determines the output device based on the intent of the individual regarding the object. In some embodiments, responsive to determining that the individual intended to exit the area with the object (e.g., take the object), determining the output device to transmit the alert to based on the intent of the individual regarding the object further includes determining the output device based on a position of the individual. In additional or alternative embodiments, the output device includes at least one of a video display device in the area, a speaker in the area, and a wireless device associated with the individual. In alternative embodiments, responsive to determining that the individual intended to leave the object, determining the output device based on the intent of the individual regarding the object further includes determining the output device is a user interface associated with an operator of the area. In additional or alternative embodiments, a machine learning model can be used to predict the intent of the individual.

Figure 8:
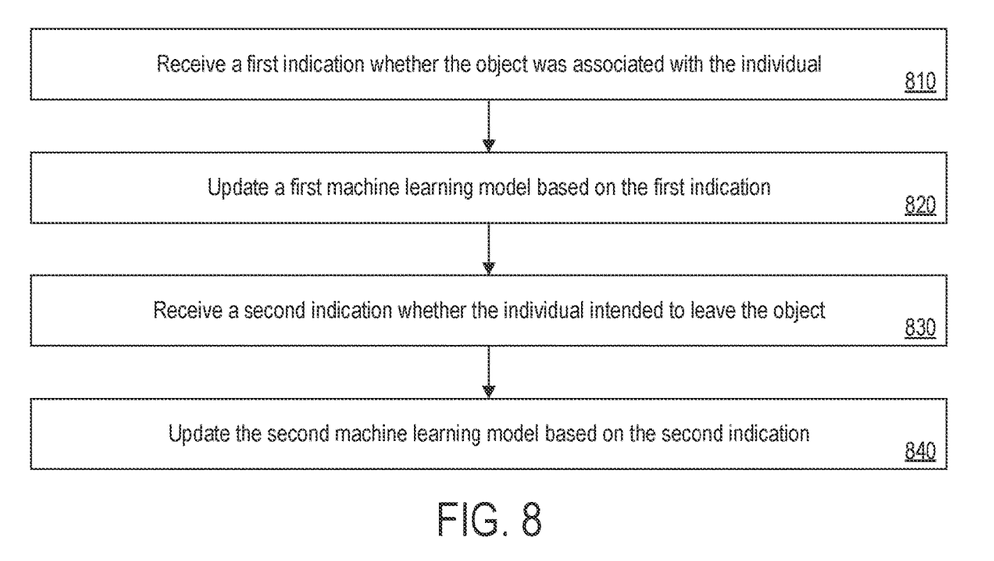

FIG. 8 illustrates an example of a process for using a machine learning model to determine the association between the object and the individual and to determine the intent of the individual in regards to the object. At block 810, processing circuitry 224 receives, via network interface 222, a first indication whether the object was associated with the individual. At block 820, processing circuitry 224 updates a first machine learning model based on the first indication. At block 830, processing circuitry 224 receives, via network interface 222, a second indication whether the individual intended to leave the object. At block 840, processing circuitry 224 updates the second machine learning model based on the second indication.

Various operations from the flow charts of FIGS. 5-8 may be optional with respect to some embodiments of monitoring systems and related methods. In some embodiments, blocks 610, 620, 630, 640, 650, and 660 of FIG. 6; blocks 710 and 720 of FIG. 7; and blocks 810, 820, 830, and 840 are optional.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the subject specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

Further, the disclosure comprises examples according to the following clauses:

Clause 1. A method of operating a cabin monitoring system, the method comprising:
    determining, by processing circuitry of the cabin monitoring system, that an object located within an area is associated with an individual;
    determining, by the processing circuitry, that the individual is exiting the area; and
    transmitting, by the processing circuitry via a transceiver of the cabin monitoring system, an alert to an output device based on determining that the individual is exiting the area, the alert indicating that the object has been left in the area.

Clause 2. The method of Clause 1, wherein the area is a cabin of an aircraft, and wherein determining that the individual is exiting the area comprises determining that the individual is deboarding the aircraft.

Clause 3. The method of Clause 1, wherein determining that the object is associated with the individual comprises:
    receiving first position information indicating a position of the object from a first sensor of the cabin monitoring system;
    receiving second position information indicating a position of the individual from a second sensor of the cabin monitoring system; and
    determining that the object is associated with the individual based on the first position information and the second position information.

Clause 4. The method of Clause 3, wherein determining that the object is associated with the individual based on the first position information and the second position information comprises determining that the object is in contact with the individual for a period of time greater than a predetermined threshold.

Clause 5. The method of Clause 1, wherein determining that the object is associated with the individual further comprises:
    receiving motion information associated with the individual indicating an interaction with the object from a motion sensor of the cabin monitoring system; and
    determining that the object is associated with the individual based on a type of the interaction.

Clause 6. The method of Clause 1, wherein determining that the object is associated with the individual further comprises:
    determining a first characteristic of the object;
    determining a second characteristic of the individual; and
    determining that the object is associated with the individual based on a predetermined association of objects having the first characteristic and individuals having the second characteristic.

Clause 7. The method of Clause 1, further comprising:
responsive to determining that the individual is exiting the area that includes the object, determining, by the processing circuitry, an intent of the individual regarding the object; and
responsive to determining the intent of the individual regarding the object, determining, by the processing circuitry, the output device based on the intent of the individual regarding the object.

Clause 8. The method of Clause 7, wherein determining the intent of the individual regarding the object comprises determining that the individual intended to exit the area with the object,
wherein determining the output device to transmit the alert to based on the intent of the individual regarding the object further comprises determining the output device based on a position of the individual, and
wherein the output device includes at least one of a video display device in the area or outside the area, a speaker in the area or outside the area, or a wireless device associated with the individual.

Clause 9. The method of Clause 7, wherein determining the intent of the individual regarding the object comprises determining that the individual intended to leave the object,
wherein determining the output device based on the intent of the individual regarding the object further comprises determining the output device is a user interface associated with an operator of the area.

Clause 10. The method of Clause 7, wherein determining that the object is associated with the individual comprises determining that the object is associated with the individual based on a first machine learning model, and
wherein determining the intent of the individual regarding the object comprises determining the intent based on a second machine learning model,
the method further comprising:
responsive to transmitting the alert, receiving, by the processing circuitry via the transceiver, a first indication whether the object was associated with the individual;
updating, by the processing circuitry, the first machine learning model based on the first indication;
responsive to transmitting the alert, receiving, by the processing circuitry via the transceiver, a second indication whether the individual intended to leave the object; and
updating, by the processing circuitry, the second machine learning model based on the second indication.

Clause 11. A cabin monitoring system of a vehicle, the cabin monitoring system comprising:
processing circuitry; and
memory coupled to the processing circuitry and having instructions stored therein that are executable by the processing circuitry for causing the cabin monitoring system to perform operations, the operations comprising:
determining that an object in the vehicle is associated with an individual in the vehicle;
determining that the individual is exiting the vehicle while the object remains in the vehicle; and
transmitting, via a transceiver, an alert to an output device based on determining that the individual is exiting the vehicle while the object remains in the vehicle, the alert indicating that the object has been left in the vehicle.

Clause 12. The cabin monitoring system of Clause 11, further comprising:
a first sensor within the vehicle configured to measure first position information indicating a position of the object; and
a second sensor within the vehicle configured to measure second position information indicating a position of the individual,
wherein determining that the object is associated with the individual comprises:
receiving, from the first sensor, the first position information indicating the position of the object;
receiving, from the second sensor, the second position information indicating the position of the individual; and
determining that the object is associated with the individual based on the first position information and the second position information and determining that the object is in contact with the individual for a period of time greater than a determined threshold.

Clause 13. The cabin monitoring system of Clause 11, further comprising:
a motion sensor configured to measure motion information associated with the individual,
wherein determining that the object is associated with the individual further comprises:
receiving, from the motion sensor, the motion information associated with the individual indicating an interaction with the object; and
determining that the object is associated with the individual based on a type of the interaction.

Clause 14. The cabin monitoring system of Clause 11, further comprising:
a plurality of cameras configured to capture images of the object and the individual,
wherein determining that the object is associated with the individual further comprises:
determining a first characteristic of the object based on a first image of the object;
determining a second characteristic of the individual based on a second image of the individual; and
determining that the object is associated with the individual based on a predetermined association of objects having the first characteristic and individuals having the second characteristic.

Clause 15. The cabin monitoring system of Clause 11, further comprising:
responsive to determining that the individual is exiting the vehicle while the object remains in the vehicle, determining an intent of the individual regarding the object; and
responsive to determining the intent of the individual regarding the object, determining the output device based on the intent of the individual regarding the object.

Clause 16. The cabin monitoring system of Clause 15, wherein determining the intent of the individual regarding the object comprises determining that the individual intended to exit the vehicle with the object,
wherein determining the output device based on the intent of the individual regarding the object further comprises determining the output device based on a position of the individual, and
wherein the output device includes at least one of a video display device associated with the vehicle, a speaker associated with the vehicle, or a wireless device associated with the individual.

Clause 17. The cabin monitoring system of Clause 15, wherein determining the intent of the individual regarding the object comprises determining that the individual intended to leave the object,
wherein determining the output device based on the intent of the individual regarding the object further comprises determining the output device is a user interface associated with an operator of the vehicle.

Clause 18. The cabin monitoring system of Clause 11, wherein the alert comprises at least one of an identification of the individual, an identification of the object, or a position of the object.

Clause 19. A non-transitory computer readable medium having instructions stored therein that, when executed by processing circuitry, cause the processing circuitry to perform operations, the operations comprising:

determining that an object located within an area of an aircraft is associated with an individual located within the area;

determining that the individual is exiting the area and is not likely to return to the area while the object remains in the area; and responsive to determining that the individual is exiting the area and is not likely to return to the area while the object remains in the area, facilitating transmission of notification data to an output device, wherein the notification data indicates that the object has been left in the area.

Clause 20. The non-transitory computer readable medium of Clause 19, wherein determining that the object is associated with the individual further comprises:

determining a first characteristic of the object;

determining a second characteristic of the individual; and determining that the object is associated with the individual based on a predetermined association of objects having the first characteristic and individuals having the second characteristic.

The flowchart and block diagrams in the Figures illustrate the architecture, functionality, and operation of possible implementations of systems, methods, and computer program products according to various examples of the subject disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose can be substituted for the specific examples shown and that the examples have other applications in other environments. This application is intended to cover any adaptations or variations. The following claims are in no way intended to limit the scope of examples of the disclosure to the specific examples described herein.

Some embodiments of the subject disclosure include capturing, storing, and using personal information associated with individuals. Personal information (e.g., information that could identify an individual) can be kept private and not provided to third-parties. Due to the sensitivity of personal information, safety measures can be taken to protect the personal information. In some examples, the personal information can be encrypted and stored on a closed network.

The invention claimed is:

1. A method of operating a cabin monitoring system, the method comprising:

determining, by processing circuitry of the cabin monitoring system, that an object located within an area is associated with an individual;

determining, by the processing circuitry, that the individual is exiting the area;

responsive to determining that the individual is exiting the area, determining, by the processing circuitry, an intent of the individual regarding the object;

responsive to determining the intent of the individual regarding the object, determining, by the processing circuitry, an output device based on the intent of the individual regarding the object; and transmitting, by the processing circuitry via a transceiver of the cabin monitoring system, an alert to the output device, the alert indicating that the object has been left in the area.

2. The method of claim 1, wherein the area is a cabin of an aircraft, and wherein determining that the individual is exiting the area comprises determining that the individual is deboarding the aircraft.

3. The method of claim 1, wherein determining that the object is associated with the individual comprises:

receiving first position information indicating a position of the object from a first sensor of the cabin monitoring system;

receiving second position information indicating a position of the individual from a second sensor of the cabin monitoring system; and determining that the object is associated with the individual based on the first position information and the second position information.

4. The method of claim 3, wherein determining that the object is associated with the individual based on the first position information and the second position information comprises determining that the object is in contact with the individual for a period of time greater than a predetermined threshold.

5. The method of claim 1, wherein determining that the object is associated with the individual further comprises:

receiving motion information associated with the individual indicating an interaction with the object from a motion sensor of the cabin monitoring system; and determining that the object is associated with the individual based on a type of the interaction.

6. The method of claim 1, wherein determining that the object is associated with the individual further comprises:

determining a first characteristic of the object that is separate from a position of the object;

determining a second characteristic of the individual that is separate from a position of the individual; and determining that the object is associated with the individual based on a predetermined association of objects having the first characteristic and individuals having the second characteristic.

7. The method of claim 1, wherein determining the intent of the individual regarding the object comprises determining that the individual intended to exit the area with the object, wherein determining the output device to transmit the alert to based on the intent of the individual regarding the object comprises determining the output device based on a position of the individual, and wherein the output device includes at least one of a video display device in the area or outside the area, a speaker in the area or outside the area, or a wireless device associated with the individual.

8. The method of claim 1, wherein determining the intent of the individual regarding the object comprises determining that the individual intended to leave the object, wherein determining the output device based on the intent of the individual regarding the object comprises determining the output device is a user interface associated with an operator of the area.

9. The method of claim 1, wherein determining that the object is associated with the individual comprises determining that the object is associated with the individual based on a first machine learning model, and wherein determining the intent of the individual regarding the object comprises determining the intent based on a second machine learning model, the method further comprising:

responsive to transmitting the alert, receiving, by the processing circuitry via the transceiver, a first indication whether the object was associated with the individual;

updating, by the processing circuitry, the first machine learning model based on the first indication;

responsive to transmitting the alert, receiving, by the processing circuitry via the transceiver, a second indication whether the individual intended to leave the object; and updating, by the processing circuitry, the second machine learning model based on the second indication.

10. A cabin monitoring system of a vehicle, the cabin monitoring system comprising:

processing circuitry; and memory coupled to the processing circuitry and having instructions stored therein that are executable by the processing circuitry for causing the cabin monitoring system to perform operations, the operations comprising:

determining that an object in the vehicle is associated with an individual in the vehicle;

determining that the individual is exiting the vehicle while the object remains in the vehicle;

responsive to determining that the individual is exiting the area, determining an intent of the individual regarding the object;

responsive to determining the intent of the individual regarding the object, determining an output device based on the intent of the individual regarding the object; and transmitting, via a transceiver, an alert to the output device, the alert indicating that the object has been left in the vehicle.

11. The cabin monitoring system of claim 10, further comprising:

a first sensor within the vehicle configured to measure first position information indicating a position of the object; and a second sensor within the vehicle configured to measure second position information indicating a position of the individual, wherein determining that the object is associated with the individual comprises:

receiving, from the first sensor, the first position information indicating the position of the object;

receiving, from the second sensor, the second position information indicating the position of the individual; and determining that the object is associated with the individual based on the first position information and the second position information and determining that the object is in contact with the individual for a period of time greater than a determined threshold.

12. The cabin monitoring system of claim 10, further comprising:

a motion sensor configured to measure motion information associated with the individual, wherein determining that the object is associated with the individual further comprises:

receiving, from the motion sensor, the motion information associated with the individual indicating an interaction with the object; and determining that the object is associated with the individual based on a type of the interaction.

13. The cabin monitoring system of claim 10, further comprising:

a plurality of cameras configured to capture images of the object and the individual, wherein determining that the object is associated with the individual further comprises:

determining a first characteristic of the object based on a first image of the object;

determining a second characteristic of the individual based on a second image of the individual; and determining that the object is associated with the individual based on a predetermined association of objects having the first characteristic and individuals having the second characteristic.

14. The cabin monitoring system of claim 10, wherein determining the intent of the individual regarding the object comprises determining that the individual intended to exit the vehicle with the object, wherein determining the output device based on the intent of the individual regarding the object comprises determining the output device based on a position of the individual, and wherein the output device includes at least one of a video display device associated with the vehicle, a speaker associated with the vehicle, or a wireless device associated with the individual.

15. The cabin monitoring system of claim 10, wherein determining the intent of the individual regarding the object comprises determining that the individual intended to leave the object,     wherein determining the output device based on the intent of the individual regarding the object comprises determining the output device is a user interface associated with an operator of the vehicle.

16. The cabin monitoring system of claim 10, wherein the alert comprises at least one of an identification of the individual, an identification of the object, or a position of the object.

17. A non-transitory computer readable medium having instructions stored therein that, when executed by processing circuitry, cause the processing circuitry to perform operations, the operations comprising:

determining that an object located within an area of an aircraft is associated with an individual located within the area;

determining that the individual is exiting the area and is not likely to return to the area while the object remains in the area;

responsive to determining that the individual is exiting the area, determining an intent of the individual regarding the object;

responsive to determining the intent of the individual regarding the object, determining an output device based on the intent of the individual regarding the object; and     facilitating transmission of notification data to the output device, wherein the notification data indicates that the object has been left in the area.

18. The non-transitory computer readable medium of claim 17, wherein determining that the object is associated with the individual further comprises:

determining a first characteristic of the object;

determining a second characteristic of the individual; and     determining that the object is associated with the individual based on a predetermined association of objects having the first characteristic and individuals having the second characteristic.

19. The method of claim 1, wherein determining the intent of the individual regarding the object comprises determining whether the individual intended to leave the object in the area.

20. The method of claim 1, wherein determining the output device based on the intent of the individual regarding the object comprises determining the output device is:

a first output device based on determining that the individual intended to take the object; or     a second output device that is different than the first output device based on determining that the individual intended to leave the object in the area.

\* \* \* \* \*